April 22, 1930.   A. J. HENRY   1,755,599
CIRCULATION ELEMENT FOR TANKS
Filed Nov. 17, 1926

INVENTOR.
Arthur J. Henry
BY
ATTORNEYS.

UNITED STATES PATENT OFFICE

ARTHUR J. HENRY, OF LOS ANGELES, CALIFORNIA, ASSIGNOR OF ONE-HALF TO SIDNEY J. BUSH, OF LOS ANGELES, CALIFORNIA

CIRCULATION ELEMENT FOR TANKS

Application filed November 17, 1926. Serial No. 148,992.

This invention relates to a circulation device for water heaters and the like employing a heating unit housed in a tank and wherein it is desirable to have water distributed throughout the tank to insure a uniform temperature throughout. It has been current practice to provide a storage tank with a heater located at the bottom. The problem of creating a circulation so as to cause a uniform temperature throughout the tank, has been difficult of solution. A common difficulty experienced with such tanks is stratification of water according to temperature, the hottest water locating itself in a layer at the top of the tank and layers of progressively cooler water being disposed below.

The present invention has for an object to cause water to circulate from the locale at which heat is transferred to the various parts of the tank. The invention herein disclosed is adapted especially to use with an electric heater disposed within the tank so that it is adapted to be housed by a casing. More specifically the invention contemplates the provision of a heater unit housing from which emanates conduits ending at various levels in the tank.

Figure 1:
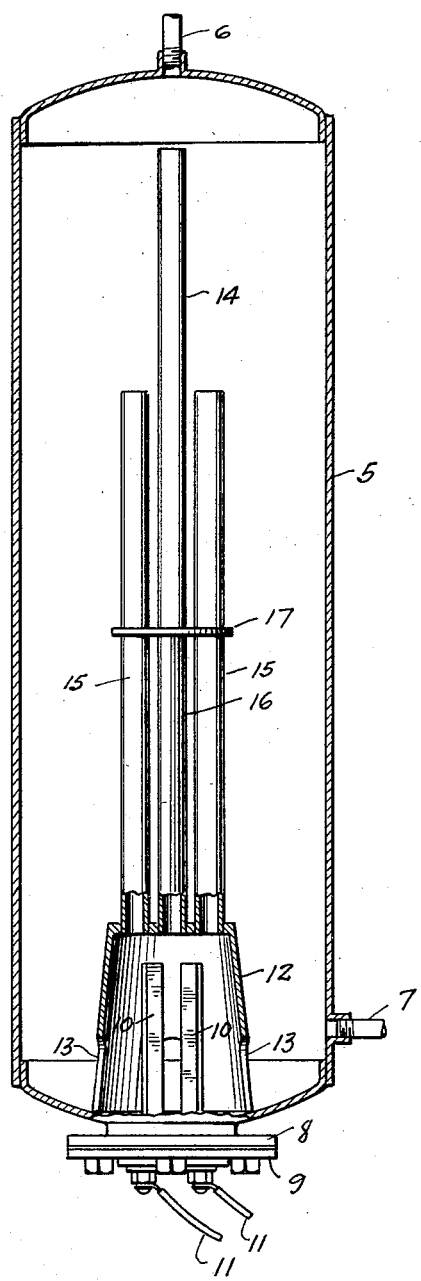
Figures 2, 3:
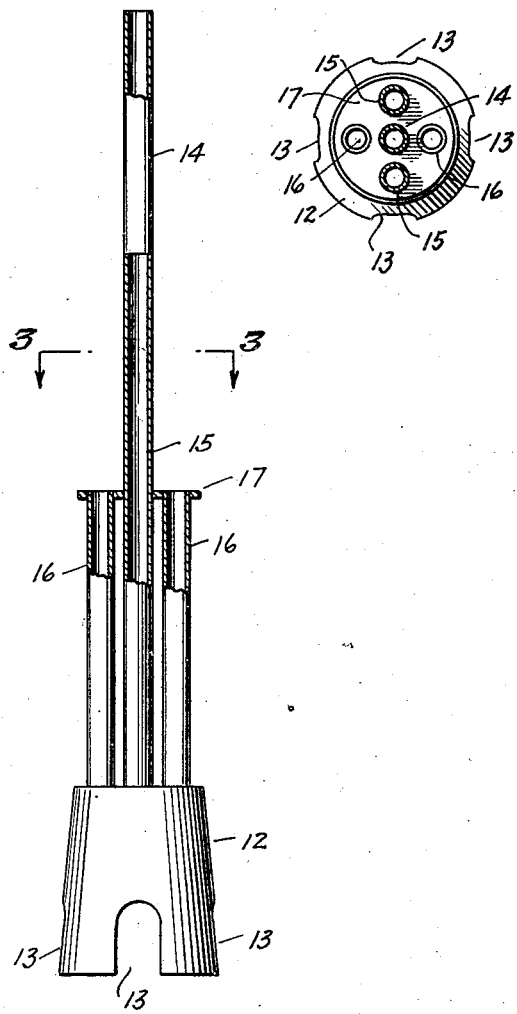

In addition to the broader objects of this invention, there are certain details of structure, whereby a simple, durable, and efficient device, economical to manufacture is obtained. A tank including a circulation device embodying my invention is illustrated in the accompanying drawing, in which:

Fig. 1 is a vertical section through tank showing a circulation device mounted over a heater unit therein, the unit being shown in elevation and the circulation device being shown partly in elevation and partly in section; Fig. 2 is an elevation partly in section of the circulation device; and Fig. 3 is section as seen upon the line 3—3 of Fig. 2.

Referring with more particularity to the drawing, a cylindrical tank for the storage of water is indicated by 5. In the top head is an outlet 6 for hot water and at the bottom is an inlet 7 for cold water. Mounted in the lower head is a heater unit. The lower head has an opening with an outwardly extending flange 8 to which is bolted a plate 9 suitably packed with a gasket or any other convenient means for providing a water pipe drain. Mounted upon the base plate 9 and extending upwardly are carbons 10. These carbons are insulated from the base and spaced from one another. The carbons 10 have terminals below the plate 9 to which electrical conductors 11 lead from a source of electrical energy not shown. This type of heater is well known in the art. It heats by reason of an electrical current passing through the water between the carbons 10, the water serving as a resistance element. However, if means are not provided to distribute heated water to various parts of the tank, the water would pass upwardly in a stream to the top of the tank and slowly force the cold water downwardly so there would be at all times a stratification of water. The present invention relates to a device for distributing the heated water.

The circulation device comprises an inverted cup 12 of frusto-conical shape, with vents 13 at the edge. In the cup bottom are five holes to receive tubes. The central hole has a tube 14 which extends upwardly and ends short of the top of the tank. Two tubes 15 are connected in oppositely disposed holes and extend to a level about one-third from the top of the tank. There are two shorter tubes 16 communicating with the interior of the cup through its bottom and shown as ending about one-half of the height of the tank. There is a supporting plate 17 shown herein for aiding in positioning the tubes. The exact distances at which the various tubes end is not pertinent to the present invention, this being dependent upon the length and diameter of the tank and various other factors. However, the tubes should end at such levels that efficient distribution of the hot water occurs.

Upon placing the heater in operation, hot water rises within the cup 12, passes upwardly through the tubes 14, 15 and 16 and is delivered at the various levels. Cold water passes downwardly through the vents 13 and into the cup, it being heated and delivered upwardly. Obviously, the hot water is distributed throughout the tank.

What I claim is:

1. In a water heater the combination with a tank having a heater unit therein and an outlet communicating with the top of the tank, a circulation device comprising an inverted cup disposed over said unit, there being vent openings in the wall of said cup adjacent the edge thereof, and a plurality of tubes of different lengths communicating with the chamber of said cup extending from the cup bottom and ending at different levels in said tank.

2. The combination of a circulation device of the character described comprising an inverted cup having a wall flaring outwardly toward the edge and provided with vents at its edge in the outer wall, a plurality of tubes upstanding from the bottom of said cup, said tubes being of different lengths and communicating with the chamber of said cup, and a heater unit housed within said cup.

In witness that I claim the foregoing I have hereunto subscribed my name this 9th day of November, 1926.

ARTHUR J. HENRY.